(12) United States Patent
Vivanco et al.

(10) Patent No.: US 12,483,950 B2
(45) Date of Patent: Nov. 25, 2025

(54) METHODS, SYSTEMS, AND DEVICES FOR CELL-RESELECTION OVER MOBILE NETWORKS USING BEAMFORMING

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); Slawomir Mikolaj Stawiarski, Carpentersville, IL (US); David Ross Beppler, Duluth, GA (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 705 days.

(21) Appl. No.: 17/865,460

(22) Filed: Jul. 15, 2022

(65) Prior Publication Data

US 2024/0022977 A1    Jan. 18, 2024

(51) Int. Cl.
*H04W 36/00* (2009.01)
*H04W 16/28* (2009.01)
*H04W 36/08* (2009.01)

(52) U.S. Cl.
CPC ..... *H04W 36/00835* (2018.08); *H04W 16/28* (2013.01); *H04W 36/0009* (2018.08); *H04W 36/0085* (2018.08); *H04W 36/085* (2023.05)

(58) Field of Classification Search
CPC ........... H04W 36/00835; H04W 16/28; H04W 36/0009; H04W 36/0085; H04W 36/085; H04W 36/324
See application file for complete search history.

(56) References Cited

U.S. PATENT DOCUMENTS

2016/0262077 A1*  9/2016  Zhang .............. H04W 36/0085
2018/0234943 A1   8/2018  Zakaria et al.
(Continued)

OTHER PUBLICATIONS

Vivanco, Daniel et al., "Apparatuses and Methods for Facilitating Efficient Paging in Networks", U.S. Appl. No. 17/865,473, filed Jul. 15, 2022, 51 pages.
(Continued)

*Primary Examiner* — Rina C Pancholi
(74) *Attorney, Agent, or Firm* — Guntin & Gust, PLC; Bryan S. Latham

(57) ABSTRACT

Aspects of the subject disclosure may include, for example, identifying a first communication device in idle mode, determining a first location associated with the first communication device, and determining a first mobility type associated with the first communication device. Further embodiments can include obtaining a neighbor list associated with a group of base stations in proximity to the first communication device, the neighbor list include a group of beam identifiers associated with each of the group of base stations. Additional embodiments can include providing first instructions to a serving base station associated with the first communication device indicating the serving base station to generate a beam priority table based on the first location of the first communication device, first mobility type associated with the first communication device, and the group of beam identifiers associated with each of the group of base stations. Other embodiments are disclosed.

20 Claims, 17 Drawing Sheets

(56) References Cited

U.S. PATENT DOCUMENTS

| | | |
|---|---|---|
| 2019/0182800 A1 | 6/2019 | Park et al. |
| 2019/0230624 A1 | 7/2019 | Islam et al. |
| 2020/0022068 A1 | 1/2020 | Ly et al. |
| 2020/0186312 A1 | 6/2020 | Mochizuki et al. |
| 2020/0274657 A1 | 8/2020 | Deenoo et al. |
| 2020/0329407 A1* | 10/2020 | Su .................... H04W 36/0088 |
| 2020/0344703 A1 | 10/2020 | Zhao et al. |
| 2020/0389800 A1 | 12/2020 | Laghate et al. |
| 2022/0132518 A1 | 4/2022 | Lee et al. |
| 2022/0393748 A1* | 12/2022 | Hill ...................... H04W 64/00 |
| 2022/0417915 A1 | 12/2022 | Gao et al. |
| 2023/0091614 A1* | 3/2023 | Zhou .................... H04B 7/0617 370/331 |
| 2023/0180039 A1 | 6/2023 | Zhohov et al. |
| 2024/0022921 A1 | 1/2024 | Vivanco et al. |
| 2024/0023062 A1 | 1/2024 | Vivanco et al. |

OTHER PUBLICATIONS

Vivanco, Daniel et al., "Apparatuses and Methods for Reducing Paging Overhead in Relation to Beam-Sweeping in Networks and Systems", U.S. Appl. No. 17/865,484, filed Jul. 15, 2022, 50 pages.

Vivanco, Daniel et al., "Methods, Systems, and Devices for Cell-Reselection Over Mobile Networks Using Beamforming", U.S. Appl. No. 17/865,460, filed Jul. 15, 2022, 73 pages.

Vivanco, Daniel et al., "Methods, Systems, and Devices for Enhancing Neighbor Lists for Mobile Networks Using Beamforming", U.S. Appl. No. 17/865,456, filed Jul. 15, 2022, 71 pages.

Vivanco, Daniel et al., "Methods, Systems, and Devices for Load Balancing Over a Mobile Network Using Beamforming", U.S. Appl. No. 17/865,461, filed Jul. 15, 2022, 70 pages.

"Final Office Action received for U.S. Appl. No. 17/865,473", 16 pages.

"Non-Final Office Action received for U.S. Appl. No. 17/865,484", 43 pages.

\* cited by examiner

210

Base Station 200c Beam Bitmap: 1, 0, 1, 0 (215a)

Base Station 200d Beam Bitmap: 1, 0, 1, 1, 0, 1, 1, 0 (215b)

Base Station 200e Beam Bitmap (215c):

| | | | |
|---|---|---|---|
| 1 | 1 | 0 | 0 |
| 0 | 1 | 0 | 0 |
| 1 | 1 | 1 | 1 |
| 1 | 1 | 1 | 1 |
| 0 | 0 | 1 | 0 |
| 1 | 0 | 1 | 0 |
| 1 | 0 | 1 | 1 |
| 1 | 1 | 1 | 1 |
| 0 | 0 | 0 | 1 |
| 1 | 0 | 1 | 1 |
| 0 | 0 | 1 | 0 |
| 0 | 0 | 0 | 1 |
| 1 | 1 | 0 | 1 |
| 0 | 1 | 1 | 1 |
| 1 | 1 | 1 | 1 |
| 1 | 0 | 0 | 1 |

| UE | Latitude | Longitude | Altitude |
|---|---|---|---|
| UE1 | Lat1 | Long1 | Alt1 |
| UE2 | Lat2 | Long2 | Alt2 |
| UE3 | Lat3 | Long3 | Alt3 |

| UE | Geolocation | High Throughput | Low Throughput | UE Type | High Mobility | Low Mobility |
|---|---|---|---|---|---|---|
| UE1 | Lat1/Long1/Alt1 | Beam=3/ PCI=30/ enB=5 | Beam=2/ PCI=20/ enB=5 | Beam=5/ PCI=50/ enB=5 | Beam=7/ PCI=70/ enB=5 | Beam=1/ PCI=10/ enB=5 |
| UE2 | Lat2/Long2/Alt2 | Beam=3/ PCI=30/ enB=2 | Beam=2/ PCI=20/ enB=2 | Beam=5/ PCI=50/ enB=3 | Beam=7/ PCI=70/ enB=3 | Beam=1/ PCI=10/ enB=3 |
| UE3 | Lat3/Long3/Alt3 | Beam=4/ PCI=40/ enB=2 | Beam=2/ PCI=20/ enB=2 | Beam=15/ PCI=150/ enB=3 | Beam=17/ PCI=170/ enB=3 | Beam=63/ PCI=100/ enB=3 |

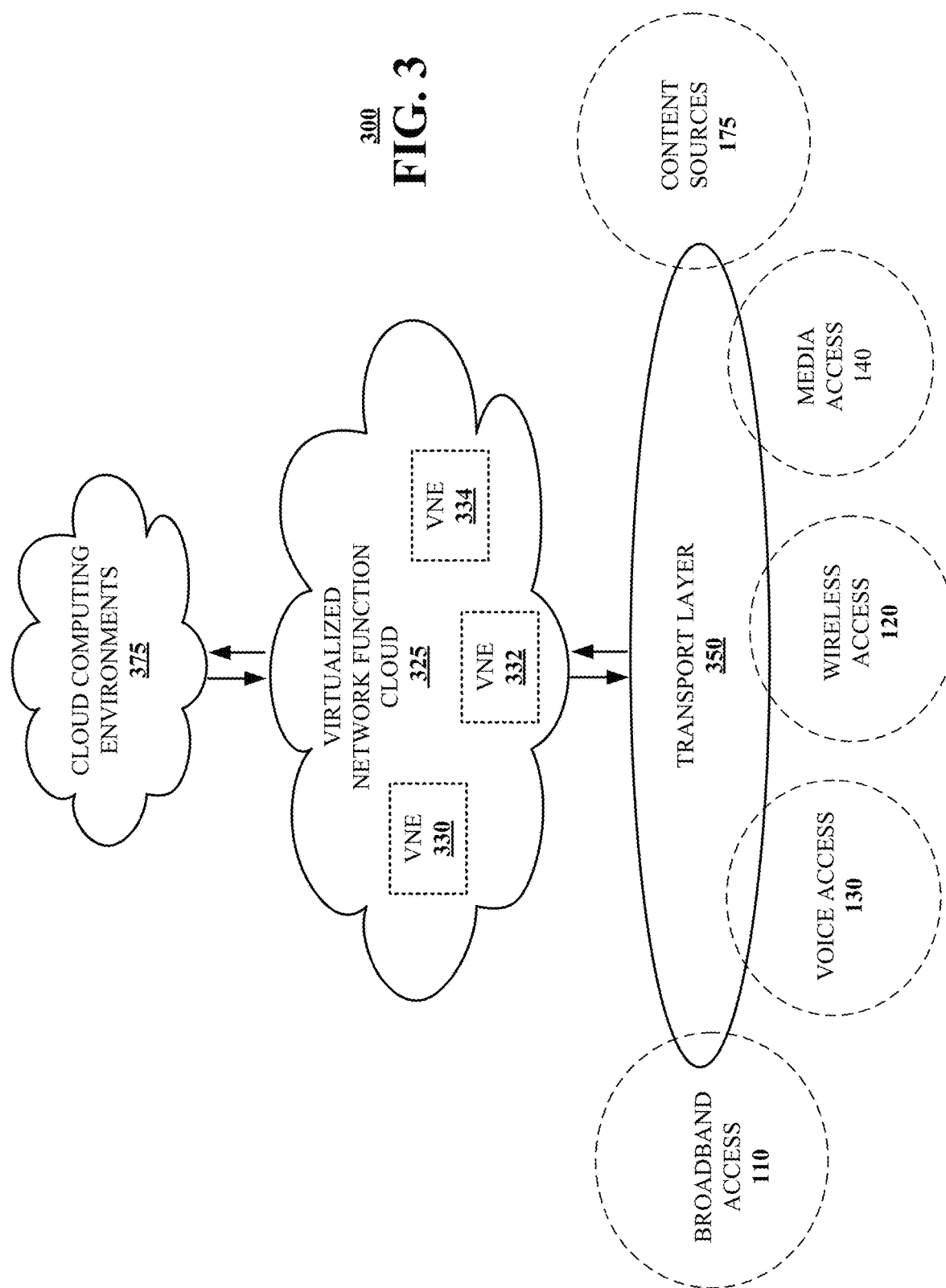

METHODS, SYSTEMS, AND DEVICES FOR CELL-RESELECTION OVER MOBILE NETWORKS USING BEAMFORMING

FIELD OF THE DISCLOSURE

The subject disclosure relates to methods, systems, and devices for cell-reselection over mobile networks using beamforming.

BACKGROUND

A user end device (e.g., communication device) traversing a mobile network may be able to communicatively couple to multiple base stations with overlapping coverage. In the current state of the art, the user end device may communicatively couple to a base station that provides the most energy to the signals traversing the downlink and/or uplink between the user end device and the base station. However, each base station may have more than one beam in which the user end device can communicatively couple. In addition, each base station may have a different number of beams and each base station can have a different beamwidth. A user end device may be able to have a higher throughput if the user end device is located in the center of a beam rather than located on an edge of the beam. Also, it is more likely that a user end device would be located in the center of the beam if the beamwidth is narrow. Further, if a base station has a greater number of beams, then each beam is narrower than a beam associated with base station having a lower number of beams.

BRIEF DESCRIPTION OF THE DRAWINGS

Reference will now be made to the accompanying drawings, which are not necessarily drawn to scale, and wherein:

FIGS. 2A-2F and FIG. 2L are block diagrams illustrating an example, non-limiting embodiment of a system functioning within the communication network of FIG. 1 in accordance with various aspects described herein.

FIG. 3 is a block diagram illustrating an example, non-limiting embodiment of a virtualized communication network in accordance with various aspects described herein.

DETAILED DESCRIPTION

Figure 1:
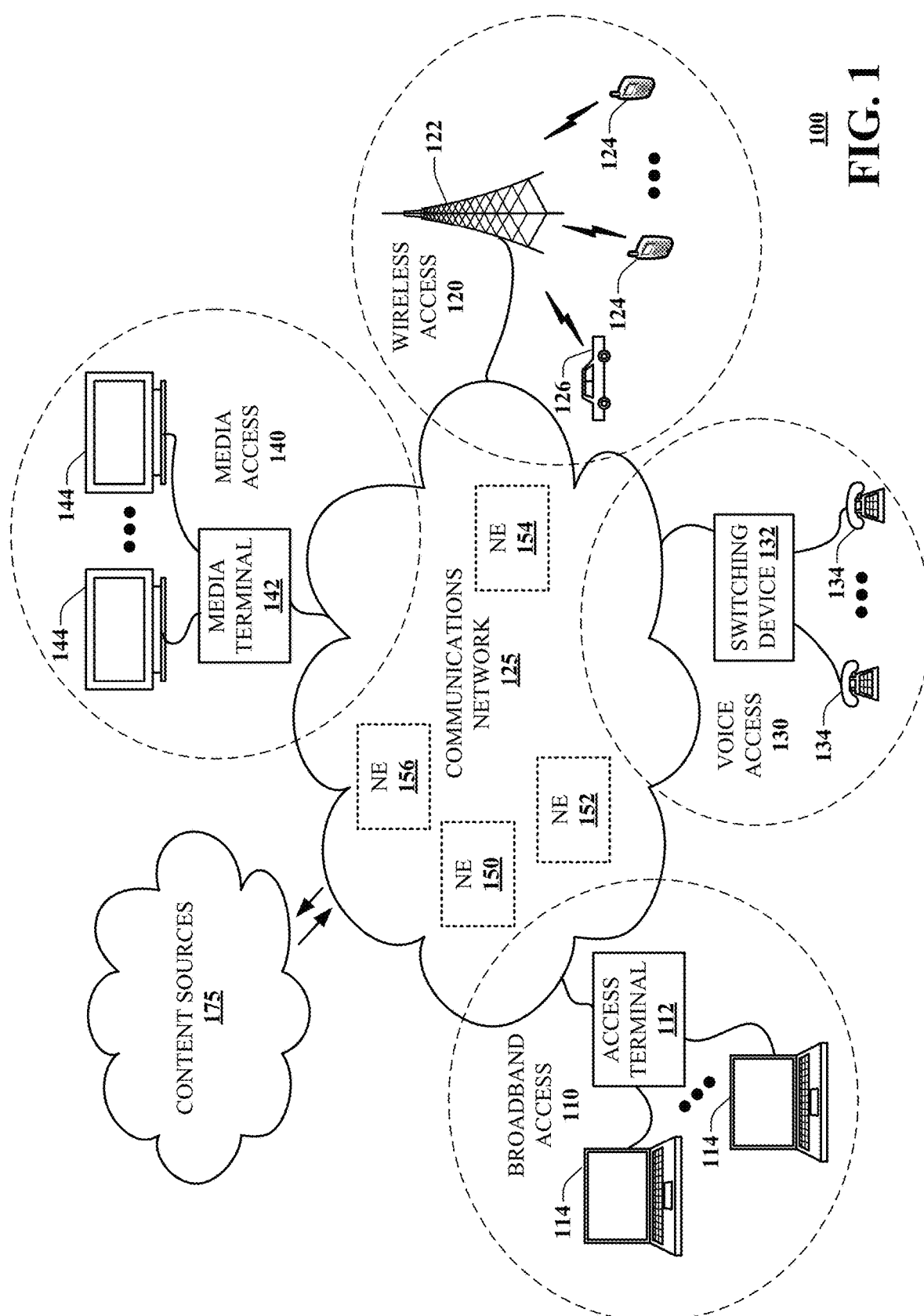
FIG. 1 is a block diagram illustrating an exemplary, non-limiting embodiment of a communications network in accordance with various aspects described herein.

The subject disclosure describes, among other things, illustrative embodiments for identifying a first communication device in idle mode, determining a first location associated with the first communication device, and determining a first mobility type associated with the first communication device. Further embodiments can include obtaining a neighbor list associated with a group of base stations in proximity to the first communication device, the neighbor list include a group of beam identifiers associated with each of the group of base stations. Additional embodiments include providing first instructions to a serving base station associated with the first communication device indicating the serving base station to generate a beam priority table based on the first location of the first communication device, first mobility type associated with the first communication device, and the group of beam identifiers associated with each of the group of base stations. Other embodiments are described in the subject disclosure.

One or more aspects of the subject disclosure include a device, comprising a processing system including a processor, and a memory that stores executable instructions that, when executed by the processing system, facilitate performance of operations. The operations can comprise identifying a first communication device in idle mode, determining a first location associated with the first communication device, and determining a first mobility type associated with the first communication device. Further operations can comprise obtaining a neighbor list associated with a group of base stations in proximity to the first communication device, wherein the neighbor list include a group of beam identifiers associated with each of the group of base stations. Additional operations can comprise providing first instructions to a serving base station associated with the first communication device indicating the serving base station to generate a beam priority table based on the first location of the first communication device, first mobility type associated with the first communication device, and the group of beam identifiers associated with each of the group of base stations.

One or more aspects of the subject disclosure include a non-transitory machine-readable medium, comprising executable instructions that, when executed by a processing system including a processor, facilitate performance of operations. The operations can comprise identifying a group of communication devices in idle mode, determining a location associated with each of the group of communication devices resulting in a group of locations, and determining a mobility type associated with each of the group of communication devices resulting in a group of mobility types. Further operations can comprise obtaining a neighbor list associated with a group of base stations in proximity to the group of communication devices, the neighbor list include a group of beam identifiers associated with each of the group of base stations. Additional operations can comprise providing a group of instructions to each of a group of serving base stations associated with the group of communication devices indicating to each of the group of serving base stations to generate a beam priority table for each of the group of communication devices resulting a group of beam priority tables based on the group of locations, group of mobility types, and a group of beam identifiers associated with each of the group of base stations.

One or more aspects of the subject disclosure include a method. The method can comprise identifying, by a processing system including a processor, a first communication device in idle mode, determining, by the processing system, a first location associated with the first communication device, and determining, by the processing system, a first mobility type associated with the first communication device. Further, the method can comprise determining, by the processing system, a first throughput requirement associated with the first communication device, and obtaining, by the processing system, a neighbor list associated with a group of base stations in proximity to the first communication device, the neighbor list include a group of beam identifiers associated with each of the group of base stations. In addition, the method can comprise providing, by the processing system, first instructions to a serving base station associated with the first communication device indicating the serving base station to generate a beam priority table based on the first location of the first communication device, first mobility type associated with the first communication device, first throughout associated with the first communication device, and the group of beam identifiers associated with each of the group of base stations.

Referring now to FIG. 1, a block diagram is shown illustrating an example, non-limiting embodiment of a system 100 in accordance with various aspects described herein. For example, system 100 can facilitate in whole or in part.in re-selecting a cell based on user end device requirements in mobile networks using beamforming. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIGS. 2A-2F and FIG. 2L are block diagrams illustrating an example, non-limiting embodiment of a system functioning within the communication network of FIG. 1 in accordance with various aspects described herein.

In one or more embodiments, a communication device in a mobile network can be in an area in which it can communicatively couple to more than one base station. Further, each base station in the mobile network can implement beamforming to be configured to have several beams associated with a cell of the base station. If a cell/base station is configured with a large number of beams, then the beamwidth of each beam is wider than a cell/base station configured with a lower number of beams. Further, a communication device located in the center of a beam can receive/transmit more energy, thereby has more throughput than if it were located at an edge of a beam. In addition, if the communication device is communicatively coupled to a cell/base station that is configured with a high number of beams (e.g., narrow beamwidth), then there is more likely that the communication device is located in the center of the beam. Thus, a server managing the handover of the communication device from a serving base station to a receiving base station can select a receiving base station configured with a high (or higher) number of beams, especially if it has high mobility and requires high throughput. FIGS. 2A-2K describes systems and methods to select a receiving base station based on the number of configured beams as well as the mobility and throughout of the communication device, among other factors.

Figure 2A:
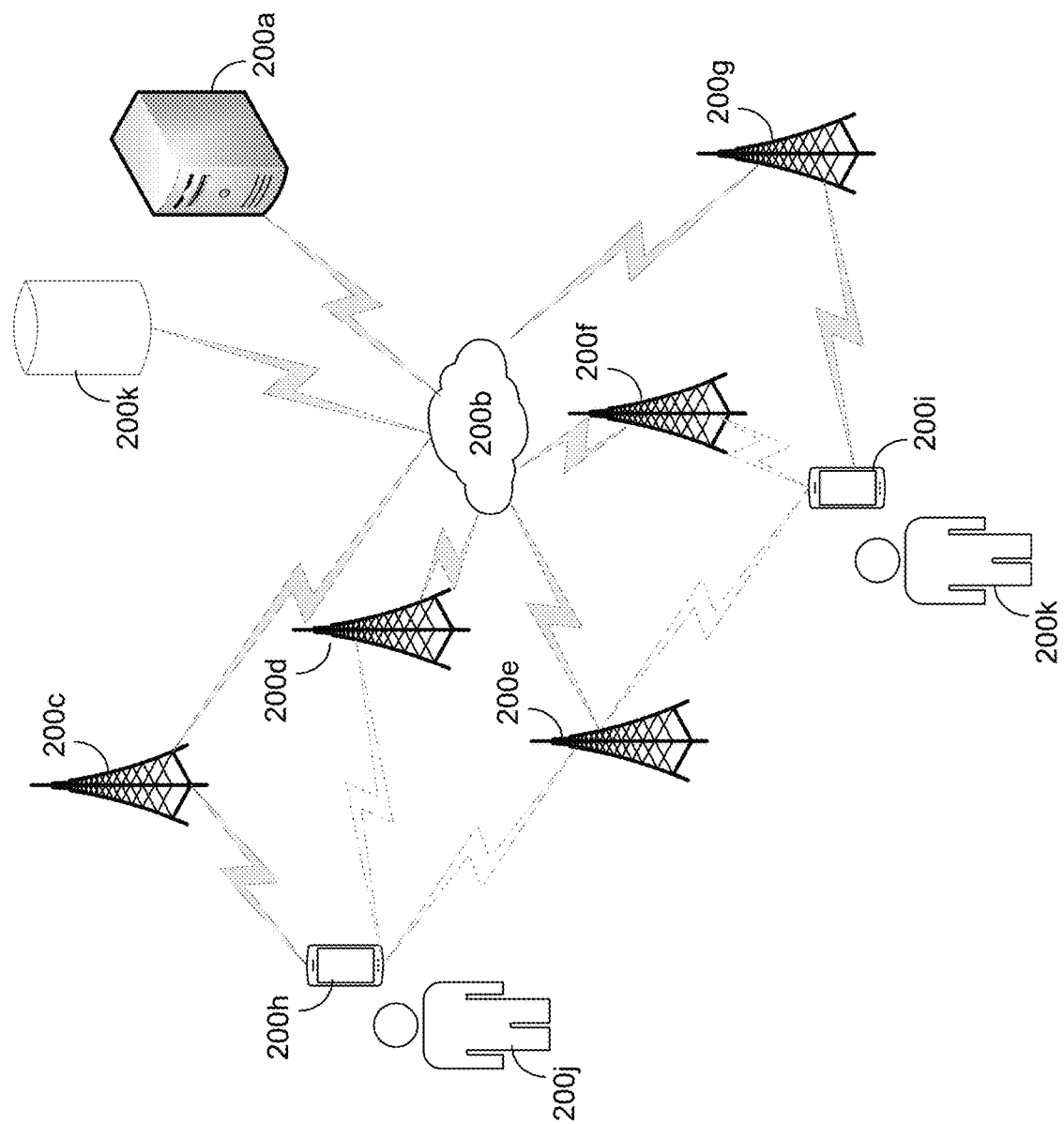

Referring to FIG. 2A, in one or more embodiments, system 200 comprise a server 200a, database 200k, base station 200c, base station 200d, base station 200e, base station 200f, and base station 200g, which are all communicatively coupled to each other over communication network 200b. Further, the system 200 can comprise communication device 200h and communication device 200i. Communication device 200h can be communicatively coupled to base station 200c, base station 200d and/or base station 200e over a mobile network. Communication device 200i can be communicatively coupled to base station 200e, base station 200f, and/or base station 200g over the mobile network. Further, communication network 200b can comprise one or more wireless communication networks, wired communication networks, or a combination thereof. In addition, server 200a can comprise one or more servers located in one location, one or more servers located in more than one location, one or more virtual servers located in one location, one or more virtual servers located in more than one location, one or more cloud servers, or a combination thereof. Each of communication device 200h and communication device 200i can comprise various devices capable of providing communication services such as a mobile phone, smartphone, mobile device, tablet computer, smart watch, wearable device, virtual reality device, augmented reality device, cross reality device, and/or combination thereof.

Figure 2B:
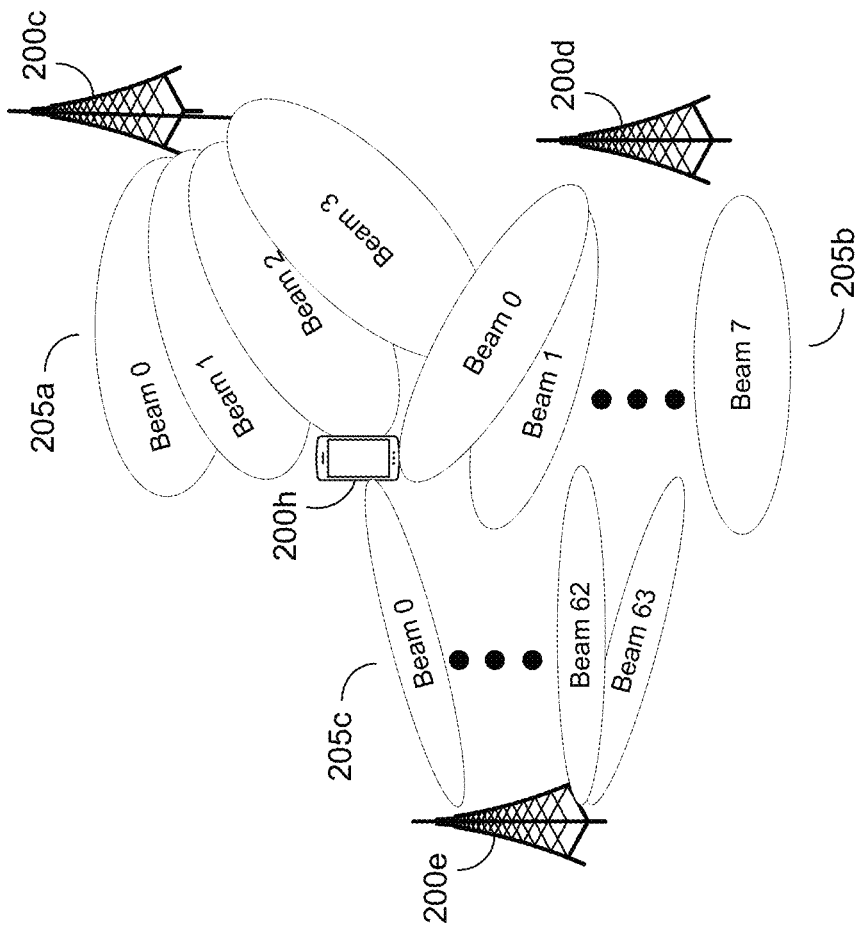

Referring to FIG. 2B, in one or more embodiments, system 205 comprises a portion of system 200 that includes base station 200c, base station 200d, and base station 200e as well as communication device 200h. Communication device 200h is in an area of overlapping coverage of cells associated with base station 200c, base station 200d, and base station 200e and each base station can be configured with a different number of beams.

In one or more embodiments, base station 200c can be configured with four beams 205a associated with a cell of the base station 200c. In addition, base station 200d can be configured with eight beams 205b associated with a cell of the base station 200d. Also, base station 200e can be configured with sixty-four beams 205c associated with a cell of the base station 200e. Communicative device 200h is located in an area that can communicatively couple with Beam 2 of base station 200c, Beam 0 of base station 200d, and Beam 0 of base station 200e. If communication device 200h requires high throughput requirement (e.g., downloading or streaming high resolution video content), then server 200a can select base station 200e for communication device 200h to communicatively couple because it will likely be located in the center of the beam, thereby receiving/transmitting higher energy signals that can lead to high throughput. However, if communication device requires low throughput requirement, then server 200a can select base station 200c because, although communication device 200h may be located at an edge of a beam, it does not require high throughput.

Figure 2C:

Referring to FIG. 2C, in one or more embodiments, the server 200a may store information regarding the communication devices and the base stations of the mobile network including information regarding the beams of each base station. To that end, each of communication device 200h and communication device 200i can generate a measurement report after scanning for beams associated with a group of base stations in their respective proximity (base station 200c, base station 200d, and base station 200e for communication device 200h; base station 200e, base station 200f, and base station 200g for communication device 200i). Further, each of communication device 200h and communication device 200i can provide its respective measurement report to their serving base station (e.g., base station 200c for communication device 200h; base station 200g for communication device 200i). In some embodiments, the measurement report can also include an identifier of the communication device, the beam identifier of the beam communicatively coupled to the communication device, and the physical cell identifier (PCI) associated with the base station communicatively coupled to the communication device. In other embodiments, the measurement report can also include signal strength and the geolocation of the communication device (e.g., latitude, longitude, and altitude coordinates). In addition, each respective serving base station (e.g., base station 200e and base station 200g) can aggregate the measurement report information from each of the group of communication devices and provide an aggregated measurement report 210a to server 200a. Further, the server 200a can store the measurement reports received from each respective serving base station in database 200k as a network topology database to be used in selecting a receiving base station when a communication device requests a handover.

In one or more embodiments, communication device 200h can request a handover from its respective base station (e.g., base station 200e) to another base station because it is moving out of the serving base station's coverage area. Further, the server 200a can obtain a group of measurement reports from the database 200k and selects a receiving base station (e.g., base station 200d) based on the group of measurement reports. In addition, the server 200a can provide instructions to the serving base station to handover (e.g., base station 200c) to the receiving base station (e.g., base station 200d).

In one or more embodiments, the server 200a can determine a group of identifiers for a group of base stations in proximity to communication device 200h. Further, the server 200a can obtain or determine a number of beams associated with each of the group of base stations from a network topology database based on the group of identifiers for the group of base stations. In addition, the selecting of the receiving base station comprises selecting the receiving base station based on the number of beams associated with each of the group of base stations.

In one or more embodiments, the server 200a can obtain a group of handover key performance indicators (KPIs) (e.g., frequency of handovers) associated with the communication device 200h. Further, the server 200a can determine a mobility type (e.g., high mobility, low mobility, stationary) for communication device 200h based on the group of handover KPIs. That is, if a communication device is highly mobile, the server 200a can select a receiving base station with a low number of beams, in which each beam is wider so that it reduces the frequency of handover (which creates more network overhead) of the communication device between base stations. Thus, the selecting of the receiving base station comprises selecting of the receiving base station based on the mobility type of communication device 200h. Also, the server 200a can receive or determine the throughput requirement associated with the communication device. Therefore, the selecting of the receiving base station can comprise selecting of the receiving base station based on the throughput requirement associated with the communication device 200h. In addition, the server 200a can receive the Quality of Service (QoS) requirements associated with the communication device. That is, the communication device is downloading or streaming high resolution video content that requires high QoS as opposed to web browsing or reviewing email messages that require low QoS. Hence, the selecting of the receiving base station can comprise selecting of the receiving base station based on the QoS requirements associated with the communication device 200h.

Referring to FIG. 2D, a communication device can scan a group of base stations in its vicinity and determine the number of beams each base station is capable of producing, as well as the number of beams currently configured to be in use.

In one or more embodiments, system 215 comprises beam bitmap 215a, beam bitmap 215b, and beam bitmap 215c.

Beam bitmap 215a is associated with base station 200c. Further, beam bitmap 215a indicates that base station 200c can be configured up to four beams and indicates which of those four beams are in use. That is, the beam bitmap indicates a 1 if a beam is in use and indicates a 0 if a beam is not in use. In addition, beam bitmap 215b is associated with base station 200d. Also, beam bitmap 215b indicates that base station 200d can be configured up to eight beams and indicates which of those eight beams are in use. Further, beam bitmap 215c is associated with base station 200e. Also, beam bitmap 215c indicates that base station 200e can be configured up to sixty-four beams and indicates which of those sixty-four beams are in use.

In one or more embodiments, server 200a can provide instructions to base station 200c to indicate that communication device 200h, which is communicatively coupled to the base station 200c, is to obtain a beam bitmap for each of base station 200c, base station 200d, and base station 200e. Further, the server 200a can determine the beam density (e.g., number of beams) for each of base station 200c, base station 200d, and base station 200e based on their respective beam bitmaps. In addition, the server 200a can adjust the neighbor list (e.g., a list of physical identifiers of base stations in proximity to communication device 200h used in selecting a receiving base station for a handover) to include the beam density for each of base station 200c, base station 200d, and base station 200e.

In one or more embodiments, communication device 200h can be initially communicatively coupled to base station 200c. Further, base station 200c can receive instructions to obtain a beam bitmap for each of base station 200c, base station 200d, and base station 200e. In addition, the base station 200c provides instructions to communication device 200h to obtain the beam bitmaps of base station 200c, base station 200d, and base station 200e. In response to receiving the instructions from base station 200c, communication device 200h can disconnect from base station 200c, and scan base station 200c, base station 200d, and base station 200e. The communication device 200h disconnects from base station 200c during its discontinuous sleep state. Further, communication device 200h generates the beam bitmap for each of base station 200c, base station 200d, and base station 200e based on it scans. In addition, the communication device 200h can reconnect to base station 200c and provide the beam bitmap for each of the base station 200c, base station 200d, and base station 200e to the server 200a via base station 200c. In some embodiments, in response to receiving instructions from the base station 200c, communication device 200h determines a beam identifier and base station identifier (e.g., PCI) for base station 200c, base station 200d, and base station 200e and provides these beam identifiers and the base station identifiers to server 200a via base station 200c. Also, the server 200a can adjust the neighbor list to include the beam identifiers and the base station identifiers. In further embodiments, communication device 200h can determine its own geolocation (e.g., latitude, longitude, and altitude coordinates) and provide it to the server 200a, via base station 200c. In addition, the server 200a, can obtain the geolocation of communication device 200h and adjust the neighbor list to include the geolocation of communication device 200h, which can indicate the location of each base station and its respective beams accordingly.

In one or more embodiments, the server 200a can receive a request, via base station 200c, from communication device 200h for a handover (e.g., communication device 200h has moved into a coverage area of a different base station). The server 200a can determine a base station 200d as the receiving base station of the handover according to the adjusted neighbor list. That is, based on the geolocation of communication device 200h and the base stations listed on the adjusted neighbor list in vicinity of the geolocation of communication device, the server 200a selects the base station 200d as the receiving base station. In addition, the server 200a can select base station 200d based on the beam bitmap and/or one or more beam identifiers associated with base station 200d listed in the adjusted neighbor list. That is, the server 200a determines that beam 0 of base station 200d is in proximity to communication device 200h and initiates the handover to base station 200d. Thus, the server 200a can provide instructions to base station 200c to handover communication device 200h to base station 200d, accordingly.

In one or more embodiments, the server 200a can receive a request, via base station 200g, from communication device 200i for a handover (e.g., communication device 200i has moved into a coverage area of a different base station). The server 200a can determine base station 200f as the receiving base station of the handover according to the adjusted neighbor list. That is, based on the geolocation of communication device 200i and the base stations listed on the adjusted neighbor list in vicinity of the geolocation of communication device, the server 200a selects the base station 200f as the receiving base station. In addition, the server 200a can select base station 200f based on the beam bitmap and/or one or more beam identifiers associated with base station 200f listed in the adjusted neighbor list. That is, the server 200a determines that a particular beam of base station 200f is in proximity to communication device 200i and initiates the handover to base station 200f. Thus, the server 200a can provide instructions to base station 200g to handover communication device 200i to base station 200f.

In one or more embodiments, a server 200a can reselect a receiving base station/cell with an appropriate number of beams (e.g., beamwidth) for a communication device to improve throughput or reduce the number of handovers (due to the high mobility of the communication device) while the communication device is in active mode. This can include generating and utilizing beam priority tables based on the mobility and throughput requirement of communication devices.

In one or more embodiments, the server 200a can identify, via base station 200c, that communication device 200h is in idle mode. Further, the server 200a can determine the location of communication device 200h. In addition, the server 200a can determine the mobility type associated with communication device 200h. Also, the server 200a can obtain a neighbor list associated with base station 200c, base station 200d, and base station 200e that includes the beam identifiers of each of base station 200c, base station 200d, and base station 200e. Further, the server 200a can provide instructions to base station 200c, which is the serving base station for communication device 200h, to generate a beam priority table based on the location of the communication device 200h, its mobility type, and the beam identifiers associated with base station 200c, base station 200d, and base station 200e. Accordingly, base station 200c generates the beam priority table, based on communication device location (shown in FIGS. 2E and 2F) and provides the beam priority table to communication device 200h.

Referring to FIG. 2E, in one or more embodiments, table 220a can list an identifier of the user end device (e.g., communication device), and corresponding geolocation (e.g., latitude, longitude, and altitude). Referring to FIG. 2F, in one or more embodiments, table 225a lists an identifier of a user end device (e.g., communication device), and geolocation (e.g., latitude, longitude, and altitude) of each user end device. Further, if a respective communication device requires a high throughput requirement, a low throughput requirement, high mobility or low mobility, then the beam priority table lists the beam number and PCI of the base station in which the communication device should connect. Further, if the respective communication device is of a particular type (IoT, stationary, drone, mobile phone, etc.), then the beam priority table lists the beam number and PCI of the base station in which the communication device should connect.

In one or more embodiments, communication device 200h can request a beam associated with another base station (e.g., a receiving base station) according to the beam priority table, for example, base station 200d. Further, communication device 200h communicatively couples to base station 200d accordingly.

In one or more embodiments, the server 200a determines a throughput requirement associated with communication device 200h. Further, the server 200a can provide instructions to generate the beam priority table according to the throughput requirement associated with communication device 200h.

In one or more embodiments, the server 200a can identify that both communication device 200h and communication device 200i are in idle mode. Further, the server 200a can determine a location associated with each of communication device 200h and communication device 200i. In addition, the server 200a can determine a mobility type and throughput requirement associated with each of communication device 200h and communication device 200i. Also, the server 200a can provide a group of instructions to each of a group of serving base stations (e.g., base station 200c and base station 200g) associated with the communication device 200h and communication device 200i indicating to each of base station 200c and base station 200g to generate a beam priority table for each of communication device 200h and communication device 200i In one or more embodiments, each of base station 200c and base station 200g generates the group of beam priority tables based on the group of locations, the group of mobility types, the group of throughput requirements, and the group of beam identifiers associated with each of base station 200c and base station 200g. Further, each of base station 200c and base station 200g provides a beam priority table of the group of beam priority tables to each of communication device 200h and communication device 200i. Each of communication device 200h and communication device 200i selects a beam associated with a receiving base station (e.g., base station 200d for communication device 200h; base station 200f for communication device 200i). Each of communication device 200h and communication device 200i communicatively couples to a beam associated with each base station 200d and base station 200f, respectively. In further embodiments, a communication device selecting a base station to communicatively couple can include sending a request to its serving base station and/or server 200a to initiate or otherwise cause a handover to the selected receiving base station.

In one or more embodiments, each of base station 200c, base station 200d, base station 200e, base station 200f, and base station 200g may use beamforming to provide coverage to their associated communication devices. Coverage of a beam-based base station is defined by the beams configured, and not the cell configured. Each cell has one or multiple Synchronization Signal Block (SSB) beams. SSB beams provide frequency & time synchronization to the communication devices before attaching (e.g., communicatively coupling) to the beam or cell. During the initial search procedure, communication devices can decode the Primary Synchronization Signal (PSS), Secondary Synchronization Signal (SSS), and New Radio Physical Broadcast Channel (NR-PBCH), which are transmitted in each SSB. Each communication device can decode PSS and SSS to gain knowledge of the Physical Cell Identifier (PCI) and then the communication device is ready to decode PBCH, from where the communication device obtains master information book (MIB) information. A sector/cell of a base station may comprise of one or more beams, each of the SSB beams can point in a given direction. They can form a grid of beams covering the whole cell area. The maximum number of beams can be frequency-dependent, such as being up to 4 (frequency bands below 3 GHz), 8 (frequency bands between 3 to 6 GHz), or 64 (frequency bands between 6 to 52.6 GHz). When performing initial attach or Handover (HO), the communication device can measure the signal strength of multiple beams (SS-RSRP, SS-RSRQ, and SS-SINR), where each of these beams can be identified by PCI and beam-ID. The communication device can decide to attach to the beam with stronger signal strength. Conversely, when the communication device is performing HO, the communication device can report signal strength of the scanned neighbor cells/beams. The serving cell/base station can then choose the beam/cell with stronger signal strength. Further, beamforming techniques improve Signal-to-Noise Ratios (SNR), increase signal coverage, and improve throughput. Beamforming techniques are able to reduce interference by canceling out or performing "null" interference of other beams, which is a large benefit in crowded environments with high densities of communication devices, and multiple overlapping signal beams.

In one or more embodiments, communication devices in mobile networks (e.g., 5G) may be located in an area where several base stations have coverage. These base stations may use beamforming techniques to provide coverage to the communication devices. Some base stations may be configured with large number of beams (e.g., 64), and other base stations configured with small number of beams (e.g., 4). Further, communication devices moving around the cell can trigger a handover every time the communication device moves out of the coverage of the serving beam of the serving base station and moves into the coverage of another beam of the same serving base station/cell. A base station/cell configured with large number of beams may induce this issue for communication devices with high mobility, which can cause a high frequency of handovers and increases mobile network overhead. In a further example, a base station configured with a large number of beams can include 128 beams and a base station configured with a small number of beams can include 8 beams.

Alternatively, in one or more embodiments, the narrower the beam, the more energy it can transmit and therefore high throughput can be expected. It is expected that a base station/cell configured with large number of beams will have narrower beams than another base station/cell configured with a low number of beams. Therefore, it is likely that a communication device with low-mobility (or no-mobility, e.g., stationary) located in a cell with multiple narrow beams can be located in the center of the beam, and thus this communication device can reach higher throughput than the being communicatively coupled to a wider beam.

One or more embodiments can include load balancing methods for base stations that utilize beamforming techniques when serving communication devices. Such methods can be implemented by server 200a, which can be a central node global control located on the Core Network, i.e. Mobile Edge Compute (MEC), Self Organized Network (SON) or RAN Intelligent Controller (MC). Server 200a can classify communication devices based on their mobility, throughput demand, and QoS requirements. Based on this classification, the server can generate traffic management conditions for communication devices in active mode.

In one or more embodiments, communication devices send measurement-reports (A3-event) of all the beams scanned in the coverage area of base stations that are in proximity to each communication device. These reports can include signal strength, PCI, and/or beam-ID of each beam/cell/base station scanned. Server 200a can then use this information to determine the number of configured beams for each neighboring cell/base station based on network topology database. An example of a measurement report is shown in FIG. 2C.

In one or more embodiments, the serving base station transmits this information to server 200a, and server 200a can contrast this information against Network Topology DB stored in database 200k and determines that base station N1 has 4 beams configured, base station N2 has 64 beams configured, and base station N3 has 8 beams configured. Also, server 200a can determine that these 3 cells overlap each other. Further, the server 200a can request a communication device to include geolocation (see FIG. 2E) of the communication device on measurement reports. Server 200a can use handover (HO) key performance indicators (KPIs) to estimate the communication device mobility.

In one or more embodiments, the server 200a can choose the best cell/base station/beam for each communication device to perform HO based on the cell-beam density and communication device conditions (i.e., mobility and throughput requirements). In addition, server 200a can determine the beam-density of the reported target cells (i.e. number of beams in each cell) and compare against communication device conditions and requirements. For example, if a communication device has high-mobility that requires a low throughput, then server 200a can mandate serving base station to be a base station with low beam-density (i.e., cell with few wider beams). As another example, if a communication device with low-mobility requires high throughput, then the server 200a can mandate the serving base station to choose a target base station with high beam-density, (i.e., cell with several narrow beams).

In one or more embodiments, communication devices can be located in a coverage area where several base stations have coverage. These base stations use beamforming to provide coverage to the communication devices. Some base stations can be configured with large numbers of beams. For example, referring to FIG. 2L, cell 1 and cell 2 are collocated and belong to a first base station, cell 1 and cell 2 have 4 and 8 beams configured and enabled. Cell 3 and Cell 4 are collocated and belong to a second base station, cell 3 and cell 4 have 8 and 64 beams configured and enabled. The first base station and the second base station are neighbors. A communication device 200h located in the overlapping coverage of the first base station and the second base station can be able to scan several beams of all 4 cells.

In one or more embodiments, under certain conditions (e.g., mobility type, throughput requirements, QoS requirements), a communication device can report to the serving cell/base station, the neighboring base stations/cells that can be scanned by the communication device. The serving cell/base station can use this information to generate a neighbor list (NL). NL is used by serving cell/base station to keep track of the identity of neighboring cells/base station to select receiving base station for handover requests. Further, this information is used to prevent cell confusion (e.g., PCI duplication of neighboring cells) and to assign priority to certain neighboring cells.

Traditionally, neighbor lists include only cell IDs, and do not include beam information. This can limit the effectiveness of NLs in current mobile networks in which base stations are using beamforming with several beams configured. In one or more embodiments, the NLs, which include beam information, are more effective and efficient. Further, in a mobile network with high beam-density, a beam based-NL approach can help serving cell/base station to have further knowledge of neighboring cells/base stations to make better traffic management and coverage decisions (e.g., mobility, traffic requirements, etc.).

One or more embodiments can include enhancing the neighbor list for base stations that are using beamforming when serving communication devices. Such embodiments can be implemented by server 200a, which can be a central node global control located on the Core Network, i.e., Mobile Edge Compute (MEC), Self Organized Network (SON) or RAN Intelligent Controller (RIC). Further, the server 200a can select a group of communication devices to perform inter/intra cell-beam scanning. Further, selected communication devices can use DRX-OFF cycle (discontinuous sleep state) to scan neighboring cells and beams. During the DRX-OFF cycle, the communication device can disconnect from serving cell/base station and read Synchronization and Signal Block (SSB)/MIB of neighboring beams. Using this time/frequency synchronization information from SSB/Master Information Block (MIB), the communication device can then read the corresponding SIB1 (cell selection information) of each beam. In SIB1, the object "ServingCellConfigCommon" provides information of the beam-bitmap, SSB transmission pattern, and/or which beams are configured and enabled in each cell. Further, the server 200a can mandate the communication device to reconnect to the serving cell/base station and report the following to the serving cell/base station: beam-ID/PCI of the scanned beams (i.e., beams that communication device can detect); beam-bitmap of the scanned beams (this can include configured and enabled beams in the cells, which the communication device may not detect in its current location); and communication device GPS geolocation.

In one or more embodiments, the serving cell/base station collects this information and transmits it to server 200a. Further, server 200a can use this information to determine the beam density of the neighboring cells and to create the neighbor list (based on beam-ID). In addition, the server 200a can infer the location/direction of the other beams that are not serving the communication device currently. Server 200a can use that information to create an extra dimension (e.g., configured beams) on the NL for traffic management. For example, a communication device can detect beam.1/PCI=10. Further, communication device obtains the beam bitmap of this beam and determines that this cell/bas base station has 8 beams configured and enabled. Communication device also detects beam.5/PCI=10 (i.e., beam #5 of the same cell). Further, communication device detects beam.3/PCI=30. The communication device obtains the beam bitmap of this beam and determines that this cell has 4 beams configured and enabled. At the same time, the communication device already determined that the communication device is attached to a cell/base station that has 8 beams configured and enabled. Also, the communication device transmits this information to server 200*a* via serving cell/ base station with its GPS geolocation. Server 200*a* can determine that at the given location of the communication device, there are 3 cells with total 8+4+8=20 beams. From these 20 beams, the communication device is within the coverage of 4 beams. Alternatively, server 200*a* can collect similar beam information from other communication devices in the vicinity to estimate and populate a coverage map of the cell and beam locations. In addition, the server 200*a* can create a neighbor list for each beam, which can include all the beams of the neighboring cells. A beam density neighbor list can provide more detailed information. For example, if the server 200*a* can determine that a communication device is located in a high-density beam area, then if the communication device has high mobility, it can engage into multiple beam HO and yield to high signaling and overhead.

In one or more embodiments, communication devices can be located in an area where several base stations have coverage. These base stations can use beamforming techniques to provide coverage to communication devices. Some base stations/cells can be configured with large number of beams (e.g., 64), and other base stations/cells configured with small number of beams (e.g., 4). A communication device moving around the cell can trigger HO every time the communication device moves out of the coverage of the serving beam and moves into the coverage of another beam of the same base station/cell. In such a scenario, the server 200*a* can try to select a receiving base station for the communication device with a wide beam (low number of beams) to reduce the frequency of handover because a base station/cell configured with large number of beams may induce this scenario for communication devices with large mobility. Alternatively, the narrower the beam, the more energy it can transmit and therefore high throughput can be expected. It is expected that a base station/cell configured with large number of beams can have narrower beams than another base station/cell configured with low number of beams. Therefore, it is likely that a communication device with low-mobility (or no-mobility) located in a cell with multiple narrow beams can be located in the center of the beam, and thus this communication device can reach higher throughput than the narrow beam cell scenario. Traditionally, mobile network devices do not provide recommendations for idle-mode load cell-reselection for base stations using beamforming. As a result, a communication device in idle move may communicatively couple in a less optimum cell/beam, which will yield to inefficient load balancing.

One or more embodiments can include a cell-reselection procedure for base stations that are using beamforming techniques when serving communication devices. A server 200*a* can implement such a procedure and can be a central node global control located on the Core Network, i.e. Mobile Edge Compute (MEC), Self Organized Network (SON) or RAN Intelligent Controller (RIC). Further, the server 200*a* aims at performing cell-reselection to communication devices in idle mode based on cell beam-density and the expected communication device requirements (e.g., throughput, QoS, etc.). Cell beam-density refers to the number of beams configured in each cell. A cell with high beam-density refers to a cell with large number of beams configured. In addition, a communication device in active mode may have already reported beam information: {beam-ID, PCI, beam bitmap}; of all the beams that provide coverage in a given area. Also, the communication device can report its geolocation (in latitude, longitude, and altitude coordinates). Also, the server 200*a* can classify idle mode communication devices based on their mobility, expected throughput and delay requirements, and communication device type. In addition, the server 200*a* already has collected communication device geolocation, and can predict its current geolocation. Based on this classification, the server 200*a* can create traffic management conditions (e.g., mobility type, throughput requirements, QoS requirements, etc.) for communication devices in idle mode.

In one or more embodiments, the server 200*a* can mandate a base station to create a customized SIBS message to these communication devices with beam priority vs. communication device geolocation to encourage the communication device to communicatively couple on the most suitable beam, which can satisfy communication device requirements when the communication device transitions from idle mode to active mode. An example is shown in FIG. 2F. Further, the communication device can decode the SIBS message, read a beam priority table and compare it against its own geolocation (communication device can obtain geolocation from its GPS while in idle mode). The communication device can then choose the most appropriate beam based on expected requirements.

Figure 2G:
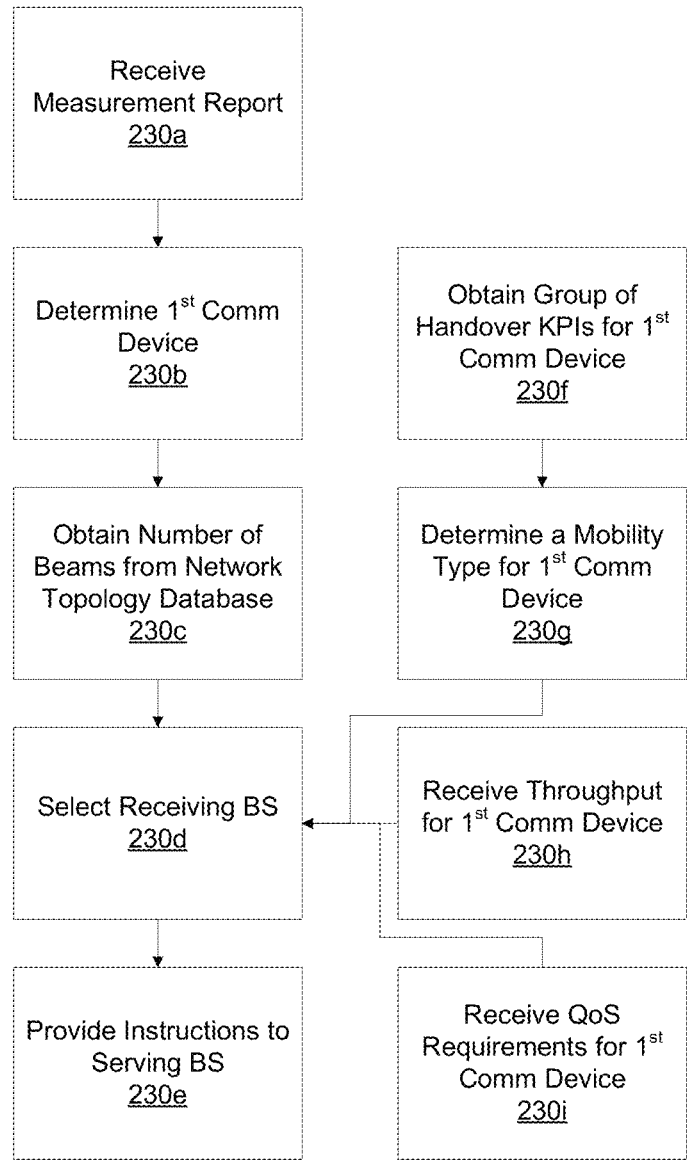
FIGS. 2G-2K depict illustrative embodiments of methods in accordance with various aspects described herein.

FIGS. 2G-2K depict illustrative embodiments of methods in accordance with various aspects described herein. Referring to FIG. 2G, in one or more embodiments, method 230 can be implemented by a server as shown in FIG. 2A. Method 230 can include the server 200*a*, at 230*a*, receiving, over a communication network, a measurement report from each of group of communication devices associated with a mobile network resulting in a group of measurement reports. Further, the method 230 can include the server 200*a*, at 230*b*, determining a first communication device of the group of communication devices requests a handover from a serving base station to another base station. In addition, the method 230 can include the server 200*a*, at 230*c*, obtaining a number of beams associated with each of the group of base stations from a network topology database based on the group of identifiers for the group of base stations. Also, the method 230 can include the server 200*a*, at 230*d*, selecting a receiving base station from a group of base stations based on the group of measurement reports. Further, the method 230 can include the server 200*a*, at 230*e*, providing instructions to the serving base station to handover the first communication device to the receiving base station. Each of the group of measurement reports includes a group of identifiers for the group of base stations in proximity to each communication device. In some embodiments, the selecting of the receiving base station comprises selecting the receiving base station based on the number of beams associated with each of the group of base stations. In addition, the method 230 can include the server 200*a*, at 230*f*, obtaining a group of handover key performance indicators associated with the first communication device. Also, the method 230 can include the server 200*a*, at 230*g*, determining a mobility type for the first communication device based on the group of handover key performance indicators. In some embodiments, the selecting of the receiving base station comprises selecting the receiving base station based on the mobility type of the first communication device. Further, the method 230 can include the server 200*a*, at 230*h*, receiving a throughput requirement associated with the first communication device. In further embodiments, the selecting of the receiving base station comprises selecting the receiving base station based on the throughput requirement associated with the first communication device. In addition, the method 230 can include the server 200*a*, at 230*i*, receiving QoS requirements associated with the first communication device. In addition, the selecting of the receiving base station comprises selecting the receiving base station based on the QoS requirements associated with the first communication device.

Figure 2H:
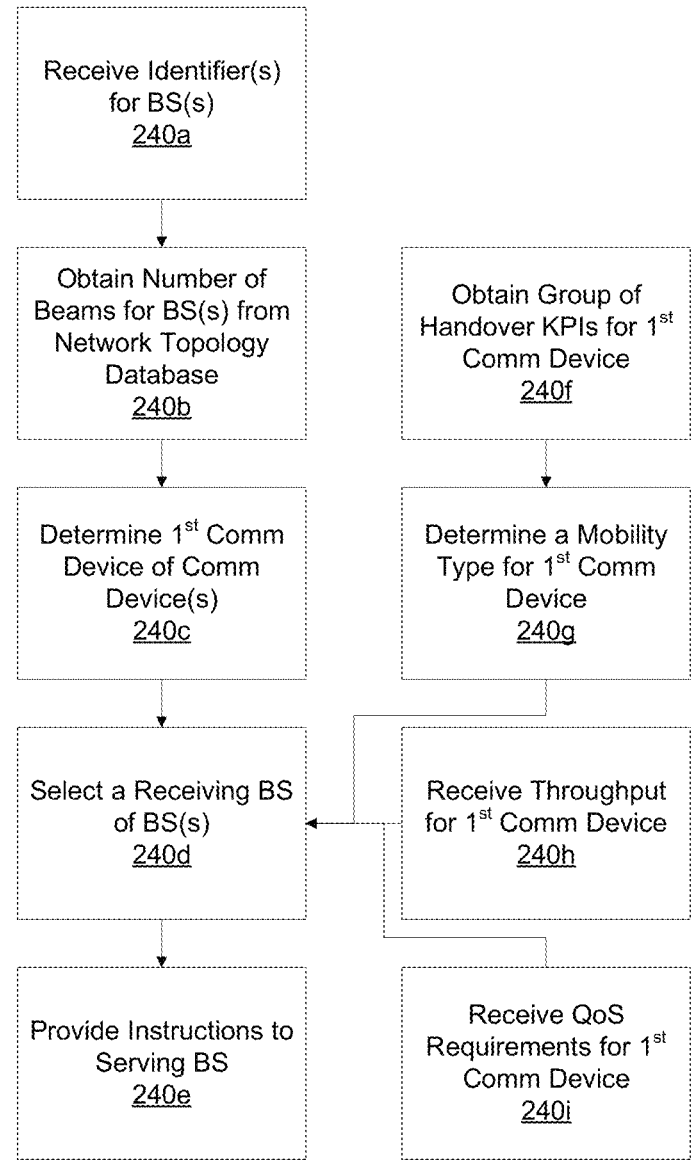

Referring to FIG. 2H, in one or more embodiments, method 240 can be implemented by a server as shown in FIG. 2A. Method 240 can include the server 200*a*, at 240*a*, receiving, over a communication network, a group of identifiers for a group of base stations in proximity to a communication device. Further, the method 240 can include the server 200*a*, at 240*b*, obtaining a number of beams associated with each of the group of base stations from a network topology database based on the group of identifiers for the group of base stations. In addition, the method 240 can include the server 200*a*, at 240*c*, determining a first communication device of a group of communication devices is requesting a handover from a serving base station to another base station. Also, the method 240 can include the server 200*a*, at 240*d*, selecting a receiving base station from the group of base stations based on the number of beams associated with each of the group of base stations. Further, the method 240 can include the server 200*a*, at 240*e*, providing instructions to the serving base station to handover the first communication device to the receiving base station.

In one or more embodiments, the method 240 can include the server 200*a*, at 240*f*, obtaining a group of handover key performance indicators associated with the first communication device. Further, the method 240 can include the server 200*a*, at 240*g*, determining a mobility type for the first communication device based on the group of handover key performance indicators. In some embodiments, the selecting of the receiving base station comprises selecting the receiving base station based on the mobility type of the first communication device. In addition, the method 240 can include the server 200*a*, at 240*h*, receiving a throughput requirement associated with the first communication device. In further embodiments, the selecting of the receiving base station comprises selecting the receiving base station based on the throughput requirement associated with the first communication device. Also, the method 240 can include the server 200*a*, at 240*i*, receiving QoS requirements associated with the first communication device. In additional embodiments, the selecting of the receiving base station comprises selecting the receiving base station based on the QoS requirements associated with the first communication device.

Figure 2I:

Referring to FIG. 2I, in one or more embodiments, method 250 can be implemented by a server, base station, or communication device as shown in FIG. 2A. Method 250 can include the server 200*a*, at 250*a*, providing, over a mobile network, first instructions to a first serving base station to indicate to a first communication device communicatively coupled to the first serving base station to obtain a beam bitmap of a group of base stations in proximity to the first serving base station. Further, the method 250 can include the first serving base station, at 250*b*, providing second instructions, over the mobile network, to the first communication device to obtain the beam bitmap. In response to receiving the second instruction, the method 250 can include the first communication device, at 250*c*, disconnecting from the first serving base station, at 250*d*, scanning the group of base stations in proximity to the first serving base station resulting in a scan, generating, at 250*e*, the beam bitmap based on the scan, reconnecting, at 250*ee*, to the first serving base station, and, at 250*f*, providing, over the mobile network, the beam bitmap to the first serving base station.

In one or more embodiments, the method 250 can include the server, at 250*g*, receiving, over the mobile network, the beam bitmap from the first serving base station. Further, the method 250 can include the server, at 250*h*, determining a beam density for each of the group of base stations. In addition, the method 250 can include the server, at 250*h*, adjusting a neighbor list to include the beam density for each of the group of base stations resulting in an adjusted neighbor list.

In one or more embodiments, the method 250 can include the first communication device, in response to receiving the second instructions, at 250*j*, determining beam identifiers and a base station identifier for each of the group of base stations in a group of beam identifiers and a group of base station identifiers, and, at 250*k*, providing, over the mobile network, the group of beam identifiers and the group of base station identifiers to the first serving base station. Further, the method 250 can include the server, at 250*l*, obtaining, over the mobile network, the group of beam identifiers and the group of base station identifiers from the first serving base station. In some embodiments, the adjusting of the neighbor list comprises adjusting the neighbor list to include the group of beam identifiers and the group of base station identifiers.

In one or more embodiments, the method 250 can include the first communication device, at 250*m*, determining a location of the first communication device. Further, the method 250 can include the first communication device, at 250*n*, providing, over the mobile network, the location of the first communication device to the first serving base station. In addition, the method 250 can include the server, at 250*o*, obtaining, over the mobile network, the location of the first communication device from the first serving base station, wherein the adjusting of the neighbor list comprises adjusting the neighbor list to include the location of the first communication device.

In one or more embodiments, the method 250 can include the server, at 250*p*, receiving a first request from the first communication device, via the first serving base station, for a first handover. Further, the method 250 can include the server, at 250*q*, determining a first receiving base station according to the adjusted neighbor list. In addition, the method 250 can include the server, at 250*r*, providing third instructions to the first serving base station to handover the first communication device to the first receiving base station. In some embodiments, the determining of the first receiving base station comprises determining the first receiving base station based on the beam bitmap. In other embodiments, the determining of the first receiving base station comprises determining the first receiving base station based on the group of beam identifiers.

In one or more embodiments, the method 250 can include the server, at 250*s*, receiving a second request from a second communication device, via a second serving base station, for a handover. Further, the method 250 can include the server, at 250*t*, determining a second receiving base station according to the adjusted neighbor list. In addition, the method 250 can include the server, at 250*u*, providing fourth instructions to the second serving base station to handover the second communication device to the second receiving base station. In further embodiments, the determining of the second receiving base station comprises determining the second receiving base station based on the beam bitmap. In additional embodiments, the determining of the second receiving base station comprises determining the second receiving base station based on the group of beam identifiers.

Figure 2J:
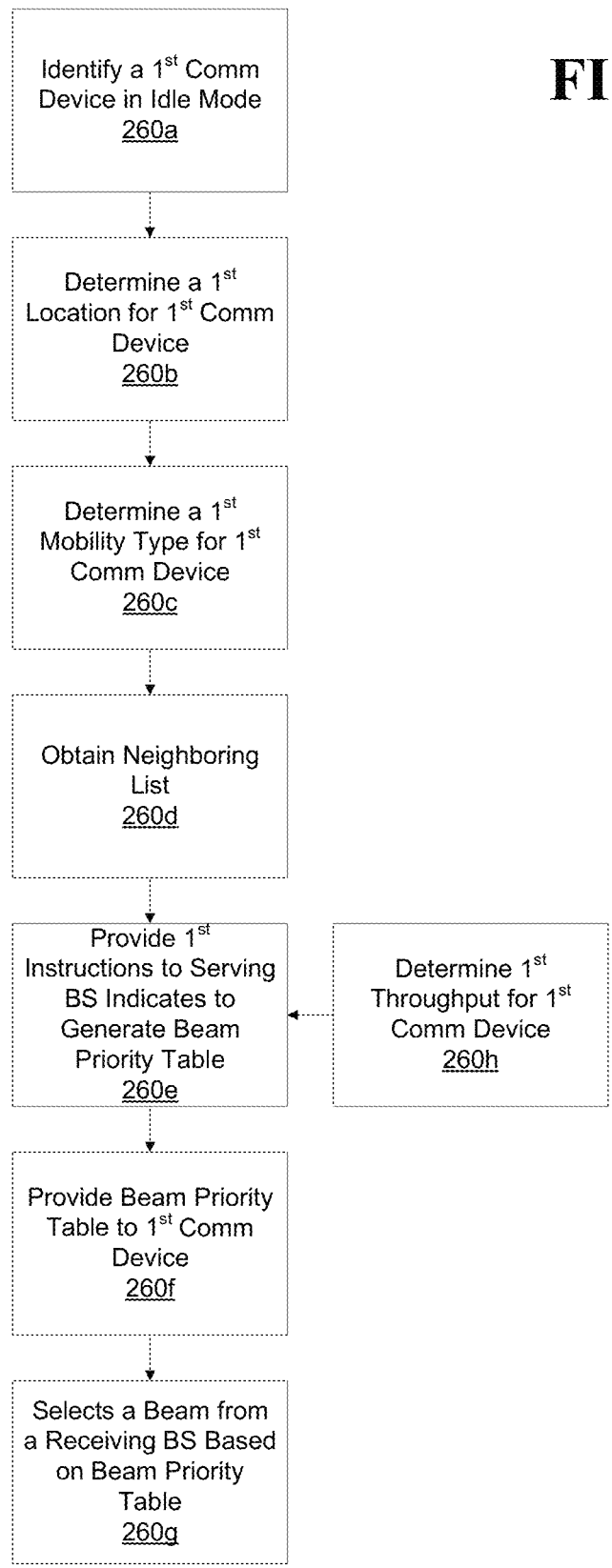

Referring to FIG. 2J, in one or more embodiments, method 260 can be implemented by a server, base station, or communication device as shown in FIG. 2A. Method 260 can include the server, at 260a, identifying a first communication device in idle mode. Further, the method 260 can include the server, at 260b, determining a first location associated with the first communication device. In addition, the method 260 can include the server, at 260c, determining a first mobility type associated with the first communication device. Also, the method 260 can include the server, at 260d, obtaining a neighbor list associated with a group of base stations in proximity to the first communication device, the neighbor list include a group of beam identifiers associated with each of the group of base stations. Further, the method 260 can include the server, at 260e, providing first instructions to a serving base station associated with the first communication device indicating the serving base station to generate a beam priority table based on the first location of the first communication device, first mobility type associated with the first communication device, and the group of beam identifiers associated with each of the group of base stations.

In one or more embodiments, the serving base station generates the beam priority table based on the location of the first communication device, mobility type associated with the first communication device, and the group of beam identifiers associated with each of the group of base stations. The method 260 can include the serving base station, at 260f, providing the beam priority table to the first communication device. Further, method 260 can include the first communication device, at 260g, selecting a beam associated with a first receiving base station according to the beam priority table, the first communication device communicatively couples to the beam associated with the first receiving base station.

In one or more embodiments, the method 260 can include the server, at 260h, determining a first throughput requirement associated with the first communication device. In some embodiments, the providing of the first instructions comprises providing the first instructions that indicate to generate the beam priority table based on the first throughput requirement, and the serving base station generates the beam priority table based on the first throughput requirement.

Figure 2K:
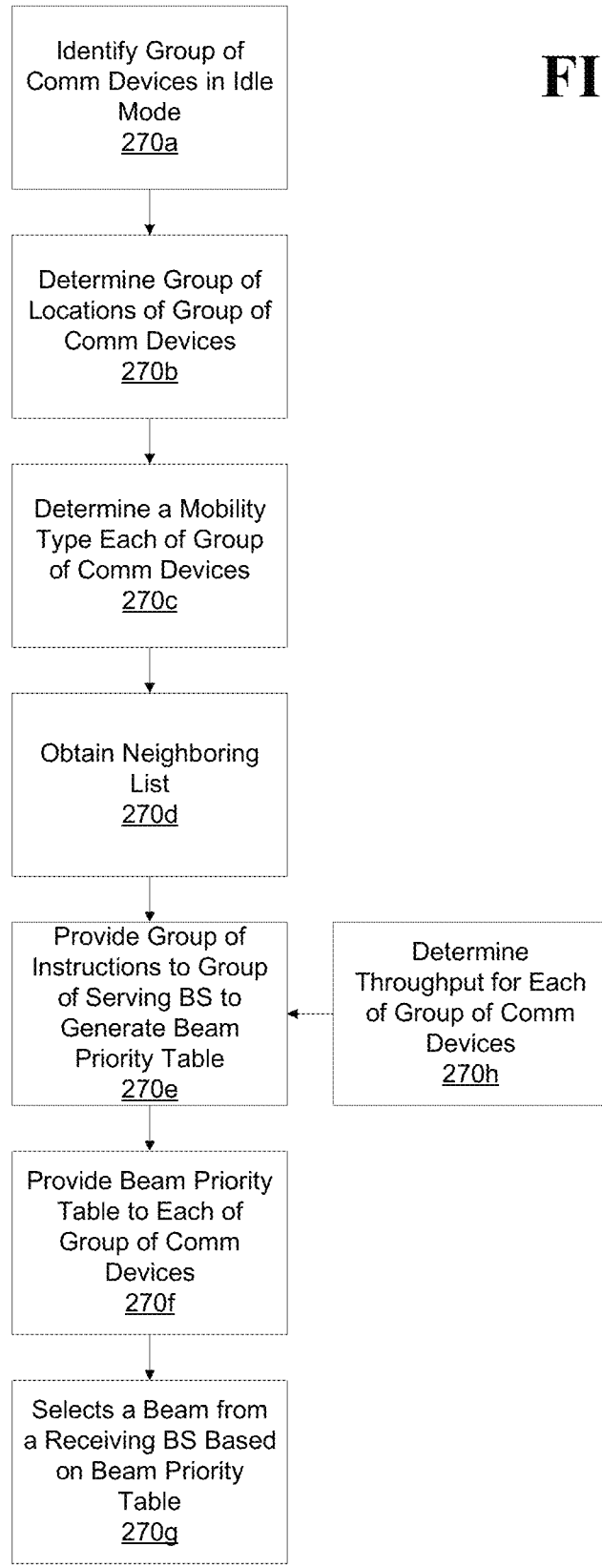
Figure 2L:
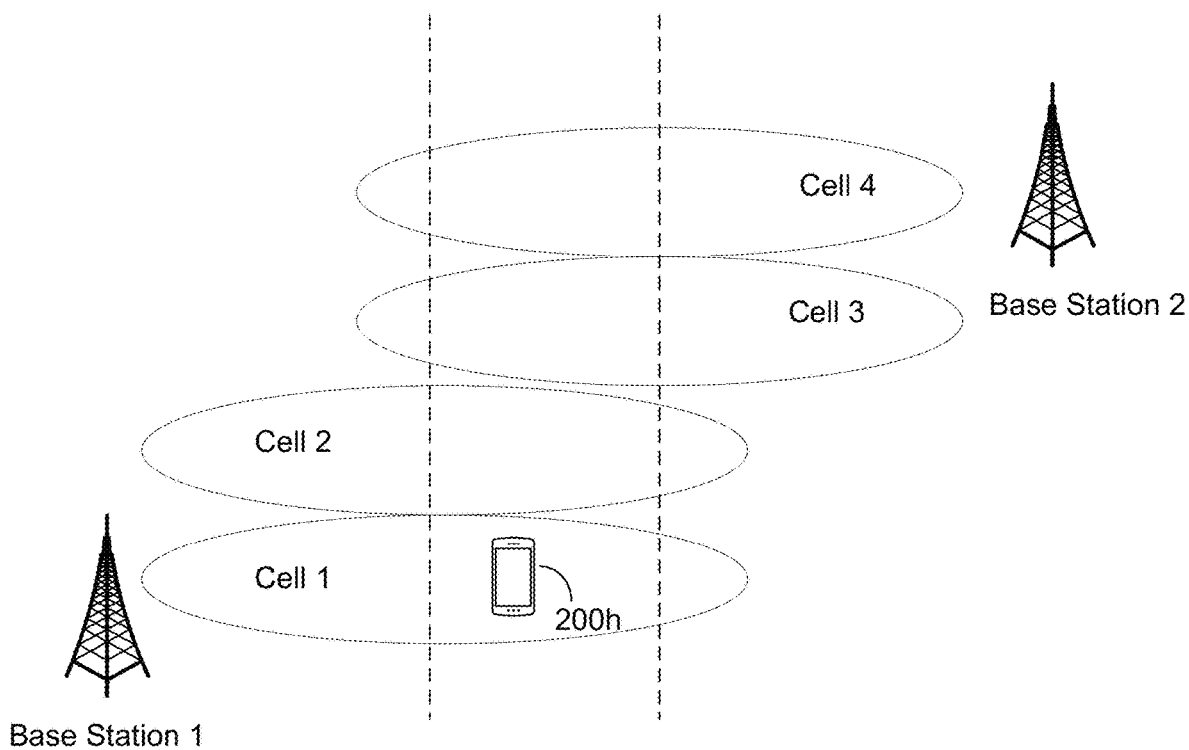

Referring to FIG. 2K, in one or more embodiments, method 270 can be implemented by a server, one or more base stations, or one or more communication devices as shown in FIG. 2A. The method 270 can include the server, at 270a, identifying a group of communication devices in idle mode. Further, the method 270 can include the server, at 270b, determining a location associated with each of the group of communication devices resulting in a group of locations. In addition, the method 270 can include the server, at 270c, determining a mobility type associated with each of the group of communication devices resulting in a group of mobility types. Also, the method 270 can include the server, at 270d, obtaining a neighbor list associated with a group of base stations in proximity to the group of communication devices, wherein the neighbor list include a group of beam identifiers associated with each of the group of base stations. Further, the method 270 can include the server, at 270e, providing a group of instructions to each of a group of serving base stations associated with the group of communication devices indicating to each of the group of serving base stations to generate a beam priority table for each of the group of communication devices resulting a group of beam priority tables based on the group of locations, group of mobility types, and the group of beam identifiers associated with each of the group of base stations.

In one or more embodiments, each of the group of serving base stations generates the group of beam priority tables based on the group of locations, the group of mobility types, and the group of beam identifiers associated with each of the group of base stations. The method 270 can include each of the group of serving base stations, at 270f, providing a beam priority table of the group of beam priority tables to each of the group of communication devices. Further, the method 270 can include each of the group of communication devices, at 270g, selecting a beam associated with a receiving base station of a group of receiving base stations, each of the group of communication devices communicatively couple to a beam associated with each receiving base station of the group of receiving base station.

In one or more embodiments, the method 270 can include the server, at 270h, determining a throughput requirement associated with each of the group of communication devices resulting in a group of throughput requirements. In some embodiments, the providing of the group of instructions comprises providing the group of instructions that indicate to generate the group of beam priority tables based on the group of throughput requirements, each serving base station of the group of serving base station generates an associated beam priority table based on a throughput requirement of the group of throughput requirements.

In one or more embodiments, a mobility type associated with a communication device, and a throughput requirement associated with the communication device can be estimated based on past network system observations and prediction models.

While for purposes of simplicity of explanation, the respective processes are shown and described as a series of blocks in FIGS. 2G-2K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. In some embodiments, one or more blocks can be performed in response to one or more blocks Portions of some embodiments can be combined with portions of other embodiments.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, 205, 210, 215, 220, and 225, 280 and methods 230, 240, 250, 260, 250 presented in FIGS. 1, 2A-2L and 3. For example, virtualized communication network 300 can facilitate in whole or in part in re-selecting a cell based on user end device requirements in mobile networks using beamforming.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
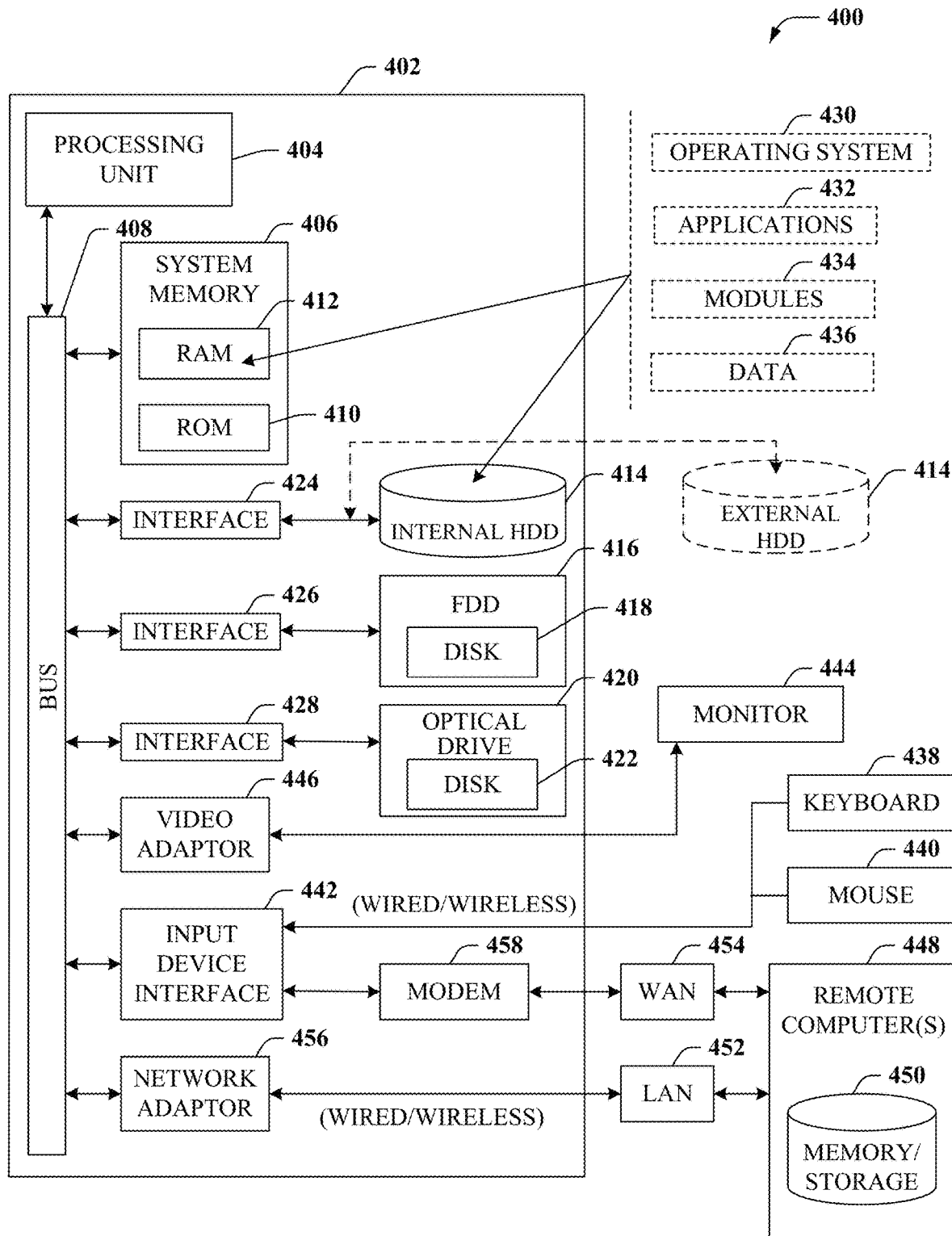
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part in re-selecting a cell based on user end device requirements in mobile networks using beamforming. Each of server 200a, database 200k, base station 200c, base station 200d, base station 200e, base station 200f, base station 200g, base station 1, base station 2, communication device 200h, and communication device 200i can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
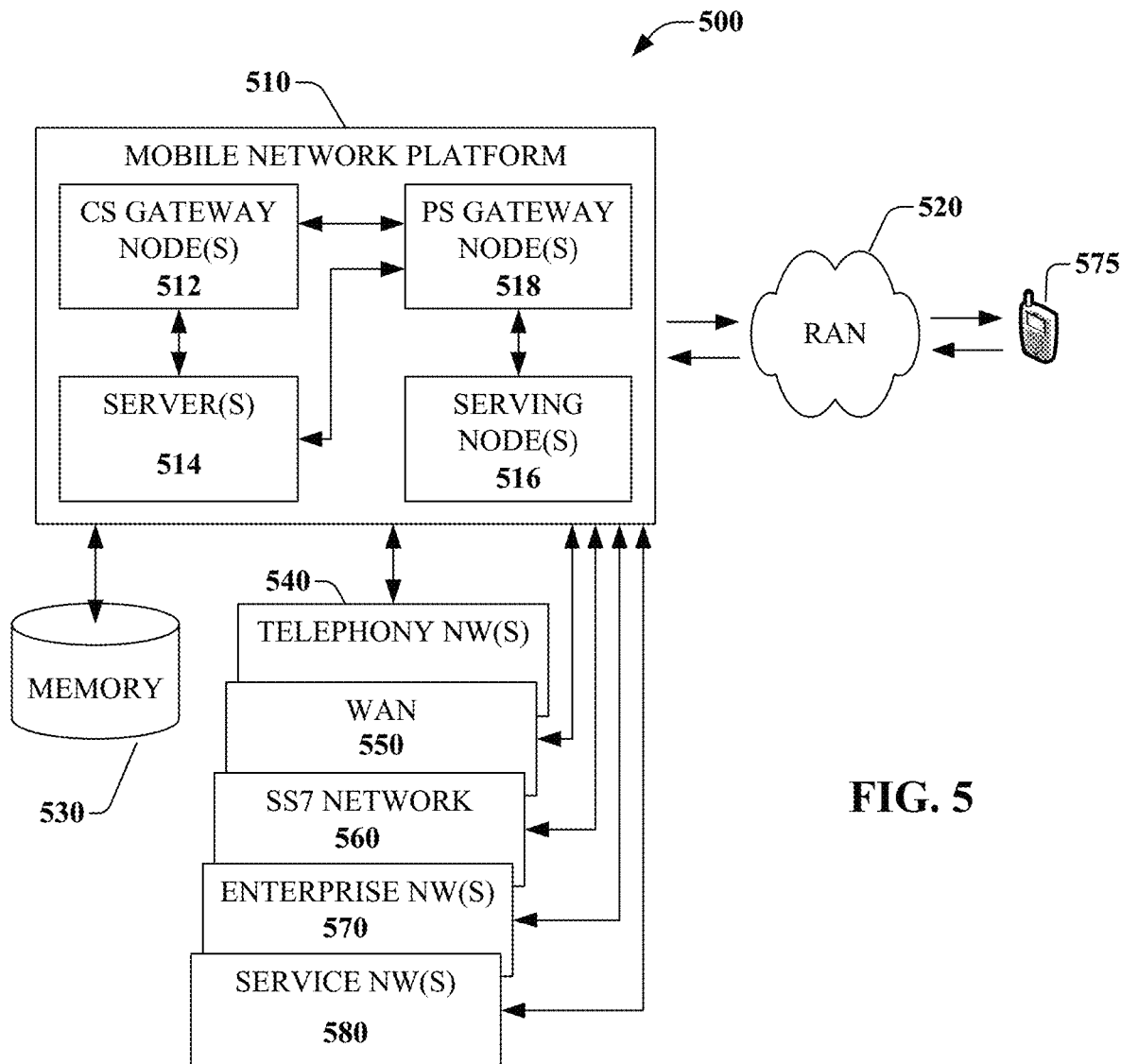
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part in re-selecting a cell based on user end device requirements in mobile networks using beamforming. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
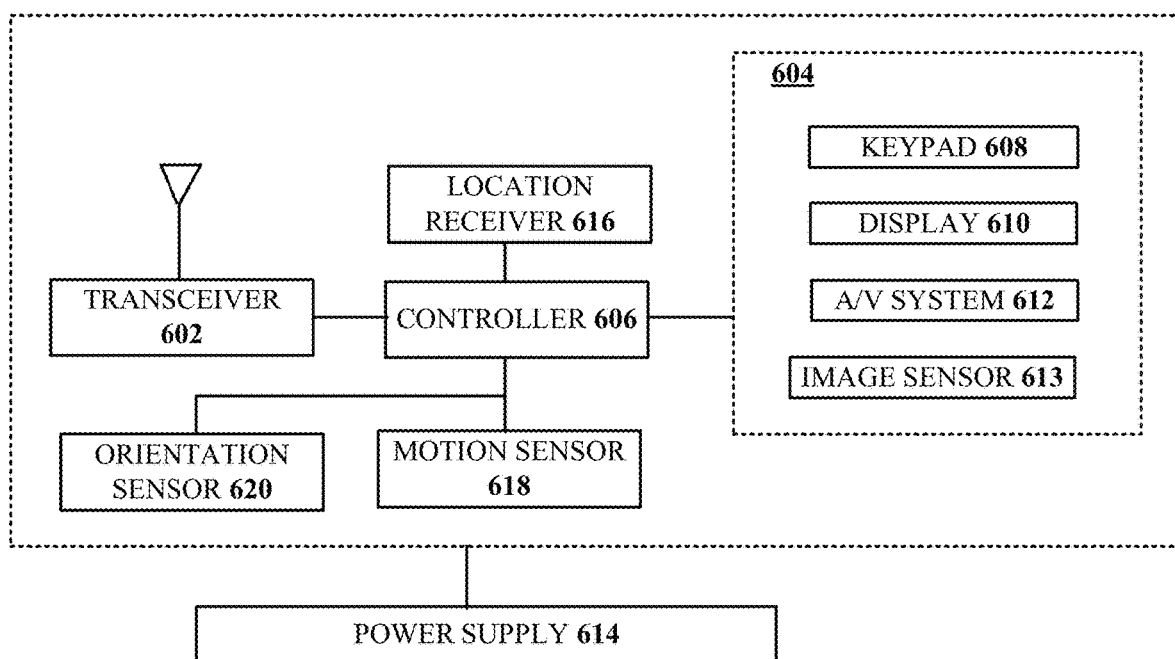
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part in re-selecting a cell based on user end device requirements in mobile networks using beamforming. Each of server 200*a*, database 200*k*, base station 200*c*, base station 200*d*, base station 200*e*, base station 200*f*, base station 200*g*, base station 1, base station 2, communication device 200*h*, and communication device 200*i* can comprise communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
identifying a first communication device in idle mode;
determining a first location associated with the first communication device;
determining a first mobility type associated with the first communication device;
obtaining a neighbor list associated with a group of base stations in proximity to the first communication device, wherein the neighbor list includes a group of beam identifiers associated with each base station of the group of base stations; and
providing first instructions to a serving base station associated with the first communication device indicating to the serving base station to generate a beam priority table based on the first location of the first communication device, the first mobility type associated with the first communication device, and the group of beam identifiers associated with each base station of the group of base stations, wherein the beam priority table is utilized by the first communication device to select and communicatively couple to a beam associated with a receiving base station according to the beam priority table.

2. The device of claim 1, wherein the serving base station generates the beam priority table based on the first location of the first communication device, the first mobility type associated with the first communication device, and the group of beam identifiers associated with each base station of the group of base stations.

3. The device of claim 2, wherein the serving base station provides the beam priority table to the first communication device.

4. The device of claim 3, wherein the first communication device selects the beam associated with the receiving base station according to the beam priority table, wherein the first communication device communicatively couples to the beam associated with the receiving base station.

5. The device of claim 1, wherein the operations comprise determining a first throughput requirement associated with the first communication device, wherein the providing of the first instructions comprises providing the first instructions that indicate to generate the beam priority table based on the first throughput requirement, wherein the serving base station generates the beam priority table based on the first throughput requirement.

6. The device of claim 1, wherein the operations comprise:
identifying a group of communication devices in idle mode;
determining a location associated with each communication device of the group of communication devices resulting in a group of locations;
determining a mobility type associated with each communication device of the group of communication devices resulting in a group of mobility types; and
providing a group of instructions to each serving base station of a group of serving base stations associated with the group of communication devices indicating to each serving base station of the group of serving base stations to generate an associated beam priority table for each communication device of the group of communication devices resulting a group of beam priority tables based on the group of locations, the group of mobility types, and the group of beam identifiers associated with each base station of the group of base stations.

7. The device of claim 6, wherein each serving base station of the group of serving base stations generates the group of beam priority tables based on the group of locations, the group of mobility types, and the group of beam identifiers associated with each base station of the group of base stations.

8. The device of claim 7, wherein each serving base station of the group of serving base stations provides the associated beam priority table of the group of beam priority tables to each communication device of the group of communication devices.

9. The device of claim 8, wherein each communication device of the group of communication devices selects a respective beam associated with a respective receiving base station of a group of receiving base stations, wherein each communication device of the group of communication devices communicatively couple to the respective beam associated with the respective receiving base station of the group of receiving base station.

10. The device of claim 6, wherein the operations comprise determining a throughput requirement associated with each communication device of the group of communication devices resulting in a group of throughput requirements, wherein the providing of the group of instructions comprises providing the group of instructions that indicate to generate the group of beam priority tables based on the group of throughput requirements, wherein each serving base station of the group of serving base stations generates an associated beam priority table based on a throughput requirement of the group of throughput requirements.

11. A non-transitory machine-readable medium, comprising executable instructions that, when executed by a processing system including a processor, facilitate performance of operations, the operations comprising:
identifying a group of communication devices in idle mode;
determining a location associated with each communication device of the group of communication devices resulting in a group of locations;
determining a mobility type associated with each communication device of the group of communication devices resulting in a group of mobility types;
obtaining a neighbor list associated with a group of base stations in proximity to the group of communication devices, wherein the neighbor list includes a group of beam identifiers associated with each base station of the group of base stations; and
providing a group of instructions to each serving base station of a group of serving base stations associated with the group of communication devices indicating to each serving base station of the group of serving base stations to generate a beam priority table for each communication device of the group of communication devices resulting a group of beam priority tables based on the group of locations, the group of mobility types, and the group of beam identifiers associated with each base station of the group of base stations, wherein a first beam priority table of the group of beam priority tables is utilized by a first communication device of the group of communication devices to select and communicatively couple to a beam associated with a receiving base station according to the first beam priority table.

12. The non-transitory machine-readable medium of claim 11, wherein each serving base station of the group of serving base stations provides the beam priority table of the group of beam priority tables to each communication device of the group of communication devices.

13. The non-transitory machine-readable medium of claim 12, wherein each communication device of the group of communication devices selects at least one beam associated with at least one receiving base station of a group of receiving base stations, wherein each communication device of the group of communication devices communicatively couple to at least one beam associated with each the at least one receiving base station of the group of receiving base stations.

14. The non-transitory machine-readable medium of claim 13, wherein the operations comprise determining a throughput requirement associated with each communication device of the group of communication devices resulting in a group of throughput requirements, wherein the providing of the group of instructions comprises providing the group of instructions that indicate to generate the group of beam priority tables based on the group of throughput requirements, wherein each serving base station of the group of serving base stations generates an associated beam priority table based on a throughput requirement of the group of throughput requirements.

15. A method, comprising:
identifying, by a processing system including a processor, a first communication device in idle mode;
determining, by the processing system, a first location associated with the first communication device;
determining, by the processing system, a first mobility type associated with the first communication device;
determining, by the processing system, a first throughput requirement associated with the first communication device;
obtaining, by the processing system, a neighbor list associated with a group of base stations in proximity to the first communication device, wherein the neighbor list includes a group of beam identifiers associated with each base station of the group of base stations; and providing, by the processing system, first instructions to a serving base station associated with the first communication device indicating to the serving base station to generate a beam priority table based on the first location of the first communication device, the first mobility type associated with the first communication device, the first throughout requirement associated with the first communication device, and the group of beam identifiers associated with each base station of the group of base stations, wherein the beam priority table is utilized by the first communication device to select and communicatively couple to a beam associated with a first receiving base station according to the beam priority table.

16. The method of claim 15, wherein the first mobility type associated with the first communication device, and the first throughput requirement associated with the first communication device are estimated based on past network system observations and prediction models.

17. The method of claim 15, wherein the serving base station generates the beam priority table based on the first location of the first communication device, the first mobility type associated with the first communication device, and the group of beam identifiers associated with each base station of the group of base stations, wherein the serving base station provides the beam priority table to the first communication device.

18. The method of claim 17, wherein the first communication device selects the beam associated with the first receiving base station.

19. The method of claim 18, wherein the first communication device is communicatively coupled to the beam associated with the first receiving base station.

20. The method of claim 15, comprising:
identifying, by the processing system, a group of communication devices in idle mode;
determining, by the processing system, a location associated with each communication device of the group of communication devices resulting in a group of locations;
determining, by the processing system, a mobility type associated with each communication device of the group of communication devices resulting in a group of mobility types; and
providing, by the processing system, instructions to each serving base station of a group of serving base stations associated with the group of communication devices indicating to each serving base station of the group of serving base stations to generate an associated beam priority table for each communication device of the group of communication devices resulting a group of beam priority tables based on the group of locations, the group of mobility types, and the group of beam identifiers associated with each base station of the group of base stations.

* * * * *